United States Patent
Miyamoto et al.

(10) Patent No.: US 10,625,482 B2
(45) Date of Patent: Apr. 21, 2020

(54) METHOD OF MANUFACTURING BEAD MEMBER

(71) Applicant: TOYO TIRE & RUBBER CO., LTD., Osaka-shi, Osaka (JP)

(72) Inventors: Ryoshi Miyamoto, Osaka (JP); Yoshiki Hashimoto, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 457 days.

(21) Appl. No.: 15/358,739

(22) Filed: Nov. 22, 2016

(65) Prior Publication Data

US 2017/0157875 A1 Jun. 8, 2017

(30) Foreign Application Priority Data

Dec. 7, 2015 (JP) ................................. 2015-238225

(51) Int. Cl.
*B29D 30/48* (2006.01)
*B29D 30/06* (2006.01)
*B60C 15/06* (2006.01)

(52) U.S. Cl.
CPC ......... *B29D 30/48* (2013.01); *B29D 30/0681* (2013.01); *B60C 15/0603* (2013.01); *B29D 2030/482* (2013.01); *B29D 2030/487* (2013.01)

(58) Field of Classification Search
CPC ............ B29D 30/48; B29D 2030/0044; B29D 2030/481; B29D 2030/482; B29D 2030/486; B29D 2030/487
See application file for complete search history.

(56) References Cited

U.S. PATENT DOCUMENTS

2014/0252673 A1* 9/2014 Tsubotani .............. B29D 30/48
264/177.1

FOREIGN PATENT DOCUMENTS

| CN | 103813899 A | 5/2014 |
|---|---|---|
| JP | 2010-269505 A | 12/2010 |
| JP | 4588594 B2 | 12/2010 |
| JP | 2011-46025 A | 3/2011 |

(Continued)

OTHER PUBLICATIONS

Office Action dated Jul. 12, 2018, issued in counterpart Chinese Application No. 201611037397.7, with English translation. (12 pages).

(Continued)

*Primary Examiner* — Geoffrey L Knable
(74) *Attorney, Agent, or Firm* — Westerman, Hattori, Daniels & Adrian, LLP

(57) ABSTRACT

A bead member manufacturing method for manufacturing a bead member by forming an annular bead filler in an outer peripheral side of an annular bead core includes a step of arranging the bead core on a forming surface of a forming table, a step of forming a first bead filler portion by winding a first rubber in an area closer to an outer side in a width direction than a side surface which does not face toward the forming surface in the outer peripheral surface of the arranged bead core, a step of turning over and rearranging the bead core and the first bead filler portion on the forming surface, and a step of forming a second bead filler portion by winding a second rubber in the outer peripheral sides of the bead core and the first bead filler portion so as to form the bead filler.

1 Claim, 8 Drawing Sheets

(56) References Cited

FOREIGN PATENT DOCUMENTS

JP       5577172 B2    8/2014
WO    2010/134475 A1  11/2010

OTHER PUBLICATIONS

Office Action dated Apr. 22, 2019, issued in counterpart CN application No. 201611037397.7, with English translation. (8 pages).
Office Action dated Jan. 17, 2019, issued in counterpart CN application No. 201611037397.7, with English translation. (14 pages).
Office Action dated Sep. 17, 2019, issued in counterpart JP application No. 2015-238225, with English translation. (6 pages).

* cited by examiner

METHOD OF MANUFACTURING BEAD MEMBER

BACKGROUND OF THE INVENTION

Field of the Invention

The present invention relates to a bead member manufacturing method for manufacturing a bead member by forming an annular bead filler in an outer peripheral side of an annular bead core.

Description of the Related Art

An annular bead core is provided in a bead portion of a pneumatic tire, and a bead filler is provided in an outer side in a tire diametrical direction of the bead core. As a method of forming a pneumatic tire, there is a method of previously manufacturing a bead member by integrating a bead core and a bead filler and forming the pneumatic tire by combining the bead member with the other tire component members.

The bead member is manufactured, as shown in FIG. 9, by forming a bead filler 200 by winding a rubber discharged from a mouth piece of an extruder around an outer peripheral side of a bead core 100 which is fixed to a forming surface 300 of a forming table. At this time, for example, in the case that a cross sectional shape of the bead core 100 is a hexagonal shape as shown in FIG. 9, the rubber is hard to enter into a narrow space between a side surface 100a in a width direction of the bead core 100 and the forming surface 300, and a gap tends to be generated between the side surface 100a in the width direction of the bead core 100 and the bead filler 200. As a result, a problem such as air intrusion and adhesion failure between the bead core and the bead filler is caused when the pneumatic tire is formed.

In the following patent document 1, there is described a tire manufacturing method for forming a bead portion by combining a bead core and a bead filler, the method including a step of forming a first bead filler area only in a portion coming into contact with the bead core among an area in an inner side in a width direction of the bead core by winding a ribbon-like bead filler rubber, a step of assembling the bead core in an outer side in a width direction of the first bead filler area by moving the bead core from an outer side in the width direction toward an inner side in the width direction in relation to the formed first bead filler area, and a step of forming the remaining bead filler area by winding the ribbon-like bead filler rubber.

Further, in the following patent document 2, there is described a forming method of a bead core assembly obtained by integrating an annular bead core and an annular bead filler, the bead filler including a first rubber body and a second rubber body, and the method including a first forming step of forming the annular first rubber body by winding a ribbon-like rubber material on a support member, a second forming step of forming the annular second rubber body by winding the ribbon-like rubber material on the bead core, and an integrating step of integrating the bead core and the second rubber body with the first rubber body on the support member after the first forming step.

According to the patent documents 1 and 2, since the bead core is assembled on the previously formed first bead filler area or the first rubber body, it is possible to theoretically do away with a gap between the side surface in the width direction of the bead core and the bead filler. However, it is hard to accurately arrange the bead core along the shape of the first bead filler area or the first rubber body, and there is a risk that any gap is generated between the side surface in the width direction of the bead core and the bead filler.

PRIOR ART DOCUMENTS

Patent Documents

Patent Document 1: JP-B-5577172
Patent Document 2: JP-B-4588594

SUMMARY OF THE INVENTION

Problem to be Solved by the Invention

Accordingly, an object of the present invention is to provide a bead member manufacturing method which can manufacture a bead member in which any gap is done away with between the side surface in a width direction of a bead core and a bead filler.

Means for Solving the Problem

The object mentioned above can be achieved by the following present invention.

More specifically, the bead member manufacturing method according to the present invention is a bead member manufacturing method for manufacturing a bead member by forming an annular bead filler in an outer peripheral side of an annular bead core, the method including:

a step of arranging the bead core on a forming surface of a forming table;

a step of forming a first bead filler portion by winding a first rubber in an area closer to an outer side in a width direction than a side surface which does not face toward the forming surface in the outer peripheral surface of the arranged bead core;

a step of rearranging the bead core and the first bead filler portion on the forming surface by turning over the bead core and the first bead filler portion; and a step of forming a second bead filler portion by winding a second rubber in the outer peripheral sides of the bead core and the first bead filler portion so as to form the bead filler.

In the bead member manufacturing method according to the present invention, it is preferable that the step of forming the first bead filler portion includes a step of winding the first rubber discharged from a mouth piece having a discharge port shape corresponding to a cross sectional shape of the formed first bead filler portion to the bead core.

In the bead member manufacturing method according to the present invention, it is preferable that the step of rearranging the bead core and the first bead filler portion by turning over the bead core and the first bead filler portion includes a step of detaching the bead core and the first bead filler portion from the forming table so as to turn over, and thereafter arranging the bead core and the first bead filler portion on a forming surface of the other forming table.

A description will be given of an operation and effect of the bead member manufacturing method according to the structure mentioned above. According to the bead member manufacturing method, since the bead filler is formed by previously forming the first bead filler portion closer to the external area in the width direction than the side surface which does not face toward the forming surface among the outer peripheral surface of the bead core, and thereafter forming the second bead filler portion by turning over the bead core and the first bead filler portion, it is possible to do away with the gap between the side surface in the width direction of the bead core and the bead filler without necessity of injection of the rubber into the space between the side surface in the width direction of the bead core and the forming surface.

DETAILED DESCRIPTION OF THE PREFERRED EMBODIMENTS

Figure 1:
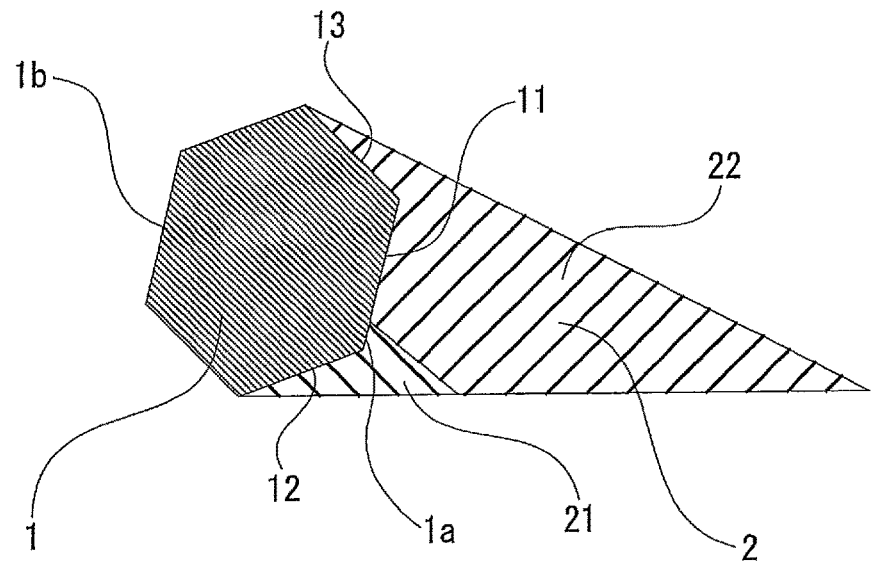
FIG. 1 is a cross sectional view of a bead member.

A description will be given below of embodiments according to the present invention with reference to the accompanying drawings. FIG. 1 is a cross sectional view of a bead member. The bead member according to the present invention is manufactured by forming an annular bead filler 2 in an outer peripheral side of an annular bead core 1.

The bead core 1 according to the present embodiment is formed into a hexagonal shape in its cross sectional shape. In the present embodiment, there is shown an example in which the bead filler 2 is formed in an outer peripheral side of the bead core 1 having the hexagonal cross sectional shape as shown in FIG. 1, more specifically, so as to come into contact with an outer peripheral surface 1a. The outer peripheral surface 1a of the bead core 1 is constructed by a core upper surface 11 which exists in an outermost side in a diametrical direction, and core side surfaces 12 and 13 which exist in both sides in a width direction of the core upper surface 11. The outer peripheral surface 1a of the bead core 1 is assumed to be a surface which exists closer to an outer side in the diametrical direction than a position of the maximum width of the bead core 1. Further, an inner peripheral surface 1b of the bead core 1 is assumed to be a surface which exists closer to an inner side in the diametrical direction than the position of the maximum width of the bead core 1.

The bead filler 2 is formed into an approximately triangular shape in its cross sectional shape. The bead filler 2 is constructed by a first bead filler portion 21 and a second bead filler portion 22. The first bead filler portion 21 is formed in an area which includes an outer area in the width direction rather than the core side surface 12. The first bead filler portion 21 according to the present embodiment also comes into contact with a part of the core upper surface 11. The second bead filler portion 22 is the portion other than the first bead filler portion 21 in the bead filler 2.

Figure 2:
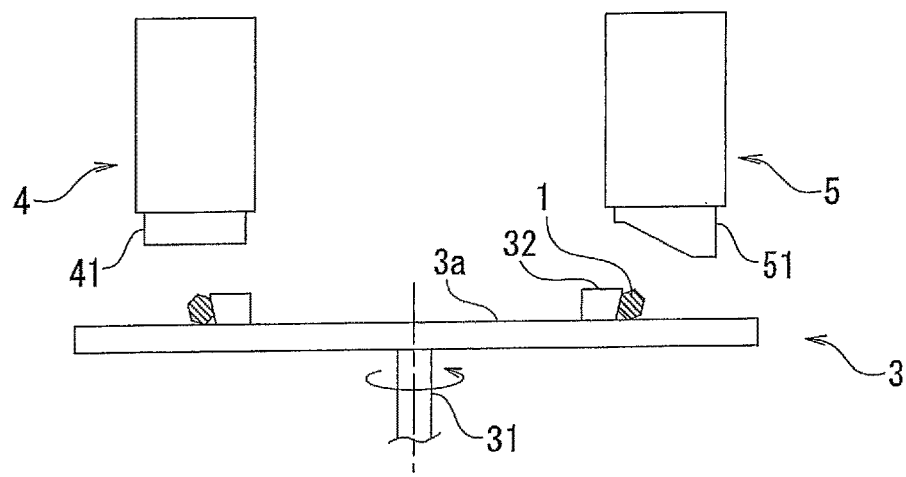
FIG. 2 is a side elevational view showing an outline structure of a bead member manufacturing apparatus.

FIG. 2 is a side elevational view showing an outline structure of a bead member manufacturing apparatus, and shows a part of the apparatus in a cross sectional view. The manufacturing apparatus is provided with a rotatable forming table 3 and two extruders 4 and 5. The forming table 3 is formed into an approximately discoid shape, and can rotate around a rotating shaft 31 as shown by an arrow in FIG. 2. The forming table 3 is rotationally driven by a motor (not shown), and a rotating speed of the forming table 3 can be freely controlled by controlling a rotating speed of the motor. A rotating direction of the forming table 3 is not limited to a direction shown in the drawing. Further, the forming table 3 is not limited to be structured such as to rotate within a horizontal surface such as the present embodiment, but may be structured such as to rotate within a vertical surface.

The annular bead core 1 is fixed to the forming table 3. A segment 32 for fixing the bead core 1 is provided on a forming surface 3a of the forming table 3. The segment 32 is formed into a circular arc shape in a plan view, and a plurality of segments 32 are provided at even intervals along a peripheral direction of the forming surface 3a. The segment 32 can move along a diametrical direction of the forming surface 3a by an air cylinder (not shown), and can press the inner peripheral surface 1b of the bead core 1 so as to be fixed by movement of the segment 32 toward an outer side in the diametrical direction. Meanwhile, the fixation of the bead core 1 is removed by movement of the segment 32 toward an inner side in the diametrical direction. An outer peripheral surface of the segment 32 is formed into a shape corresponding to the inner peripheral surface 1b of the bead core 1.

The extruders 4 and 5 are changed their relative positions to the forming table 3 by an extruder driving means (not shown). The extruders 4 and 5 have a known structure and their detailed description is omitted. However, each of the extruders is mainly provided with a hopper in which a rubber material is thrown, a screw which feeds forward the rubber material while applying heat to the rubber material, a cylindrical barrel which has a screw built-in, and a drive unit which drives the screw. The driving and the rotating speed of the screw are controlled by a control unit, and an extruding speed of the rubber can be controlled.

Figure 3A:
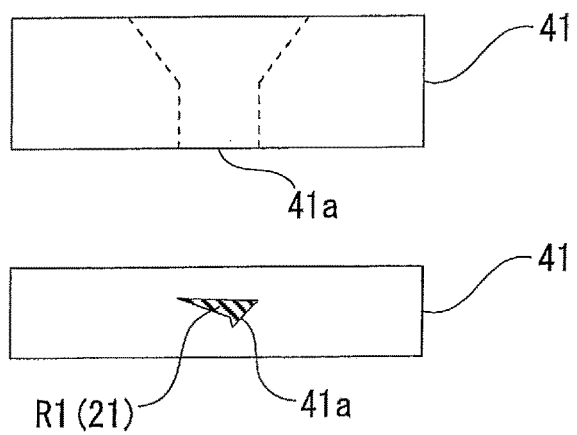
FIG. 3A is a plan view and a front elevational view of a first mouth piece.

The first extruder 4 is provided in a leading end with a first mouth piece 41. FIG. 3A shows a plan view and a front elevational view of the first mouth piece 41. In the first mouth piece 41, a first rubber R1 is discharged from a discharge port 41a which is formed in a leading end thereof. A shape of the discharge port 41a corresponds to a cross sectional shape of the first bead filler portion 21, and a cross sectional shape of the first rubber R1 discharged from the discharge port 41a of the first mouth piece 41 is the same as a cross sectional shape of the first bead filler portion 21.

Figure 3B:
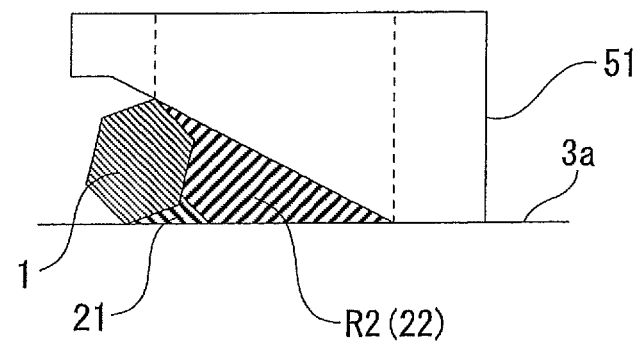
FIG. 3B is a plan view of a second mouth piece.

The second extruder 5 is provided in a leading end with a second mouth piece 51. FIG. 3B shows a plan view of the second mouth piece 51. In the second mouth piece 51, a second rubber R2 is discharged from a discharge port which is formed in a leading end thereof. The leading end of the second mouth piece 51 forms a space corresponding to a cross sectional shape of the second bead filler portion 22, together with the bead core 1, the first bead filler portion 21 and the forming surface 3a, and can form a second rubber R2 discharged from the discharge port of the second mouth piece 51 into the second bead filler portion 22 having a desired cross sectional shape.

Figure 4:
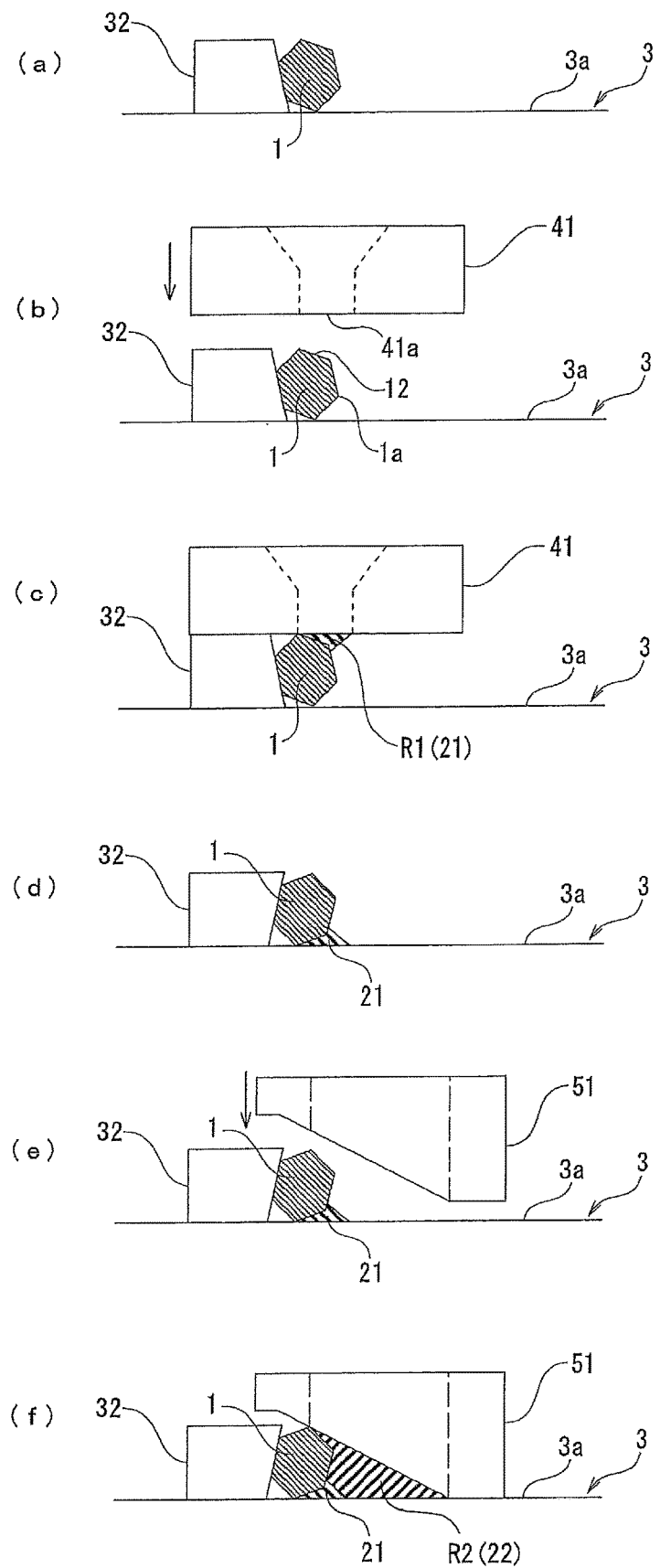
FIG. 4 is an explanatory view for describing a step of manufacturing a bead member.

Next, a description will be given of a method of manufacturing the bead member. FIG. 4 schematically shows a process of manufacturing the bead member.

First of all, the bead core 1 is arranged on the forming surface 3a of the forming table 3 and the bead core 1 is fixed by the segment 32, as shown in FIG. 4A.

Next, the first extruder 4 is moved forward to the forming table 3 and the leading end of the first mouth piece 41 is moved close to the outer area in the width direction of the bead core 1, as shown in FIG. 4B.

After the leading end of the first mouth piece 41 is moved close to the bead core 1, the first rubber R1 is discharged from the discharge port 41a of the first mouth piece 41 while rotating the forming surface 3a, as shown in FIG. 4C. As a result, the first bead filler portion 21 is formed by winding the first rubber R1 in the area closer to the outer side in the width direction than the side surface (the core side surface 12 in the present embodiment) which does not face to the forming surface 3a in the outer peripheral surface 1a of the bead core 1. After forming the first bead filler portion 21, the first extruder 4 is moved backward.

Next, the bead core 1 and the first bead filler portion 21 are detached from the forming table 3 so as to be turned over up and down, and are rearranged on the forming surface 3a. At this time, the segment 32 is turned over up and down in correspondence to the bead core 1, as shown in FIG. 4D.

Next, the second extruder 5 is moved forward to the forming table 3 and the second mouth piece 51 is moved close to the forming table 3, as shown in FIG. 4E.

After the second mouth piece 51 is moved close to the forming table 3, the second rubber R2 is discharged from the discharge port of the second mouth piece 51 while rotating the forming surface 3a as shown in FIG. 4F. As a result, the second bead filler portion 22 is formed by winding the second rubber R2 in the outer peripheral sides of the bead core 1 and the first bead filler portion 21. Finally, the second extruder 5 is moved backward after forming the second bead filler portion 22.

Other Embodiment (1) In the embodiment mentioned above, although the cross sectional shape of the bead core 1 is set to the hexagonal shape, the cross sectional shape of the bead core 1 may be set to a circular shape, an oval shape or a trapezoidal shape. However, the bead filler 2 is formed into such a shape that any gap is not generated between the bead filler 2 and the outer peripheral surface of the bead core 1.

(2) In the embodiment mentioned above, although the core upper surface 11 of the bead core 1 is inclined in the diametrical direction from the vertical direction to the forming surface 3a, the arrangement of the bead core 1 is not limited to this, and may be set such that the core upper surface 11 of the bead core 1 is vertical to the forming surface 3a.

Figure 5:
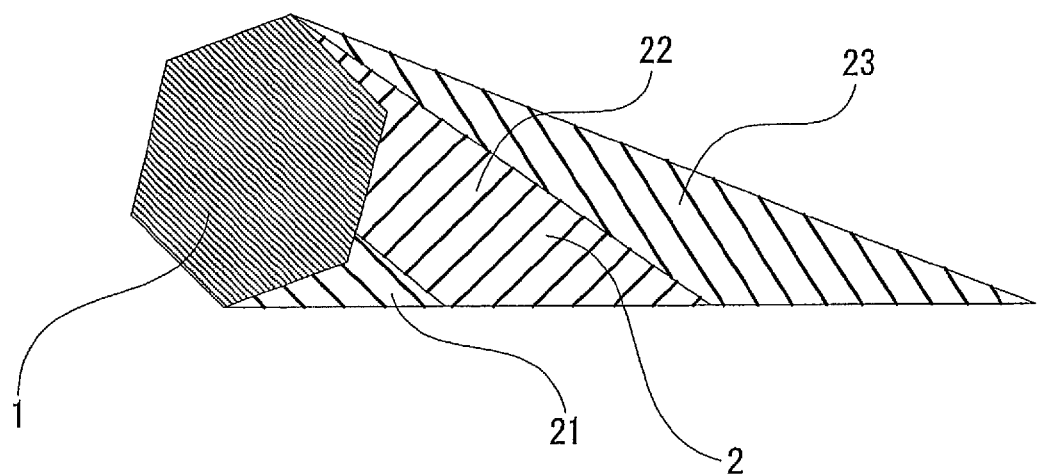
FIG. 5 is across sectional view of a bead member according to the other embodiment.

(3) In the embodiment mentioned above, although the bead filler 2 is provided with the first bead filler portion 21 and the second bead filler portion 22, the bead filler 2 maybe further provided with a third bead filler portion 23 as shown in FIG. 5. Further, the first bead filler portion 21, the second bead filler portion 22 and the third bead filler portion 23 may be all formed by the same rubber, or may be all formed by different rubbers.

(4) In the embodiment mentioned above, although the example using two extruders 4 and 5 is shown, the mouth piece may be replaced while using one extruder.

Figure 6:
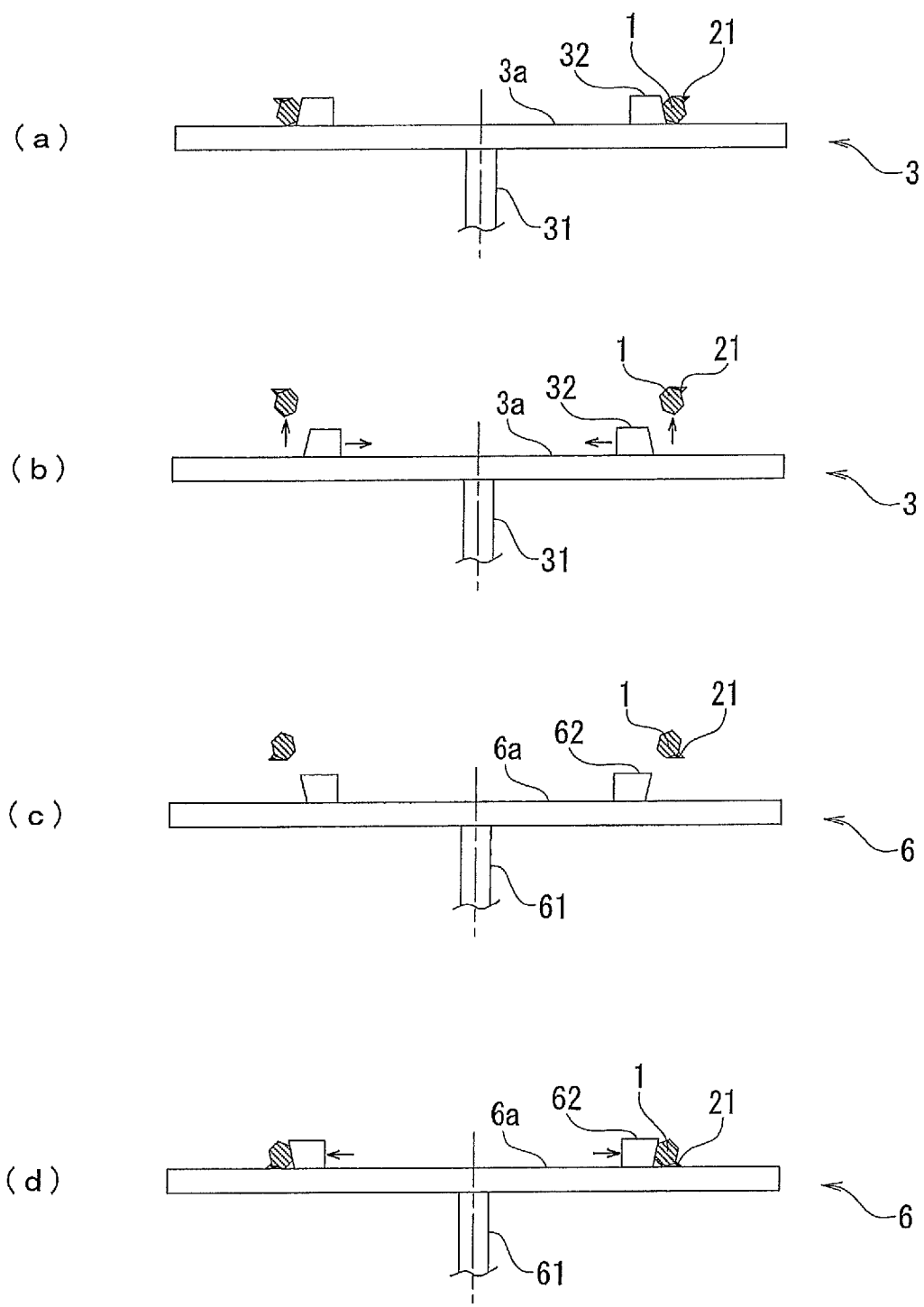
FIG. 6 is an explanatory view for describing a step of manufacturing a bead member according to the other embodiment.

(5) The process of turning over and rearranging the bead core 1 and the first bead filler portion 21 after forming the first bead filler portion 21 may include a process of arranging the bead core 1 and the first bead filler portion 21 on a forming surface of a different forming table from the forming table 3 after detaching the bead core 1 and the first bead filler portion 21 from the forming table 3 so as to turn over. A description will be given of a specific process with reference to FIG. 6. FIG. 6A shows a state in which the first extruder 4 is moved backward after forming the first bead filler portion 21. Next, the bead core 1 and the first bead filler portion 21 are detached from the forming table 3 as shown in FIG. 6B. Next, the bead core 1 and the first bead filler portion 21 are arranged above a different forming table 6 from the forming table 3 as shown in FIG. 6C. A segment 62 for fixing the bead core 1 is provided on a forming surface 6a of the forming table 6. The segment 62 is formed into such a shape that the segment 32 is turned over. Next, the bead core 1 is fixed onto the forming surface 6a of the forming table 6 by the segment 62 as shown in FIG. 6D.

Figure 7:
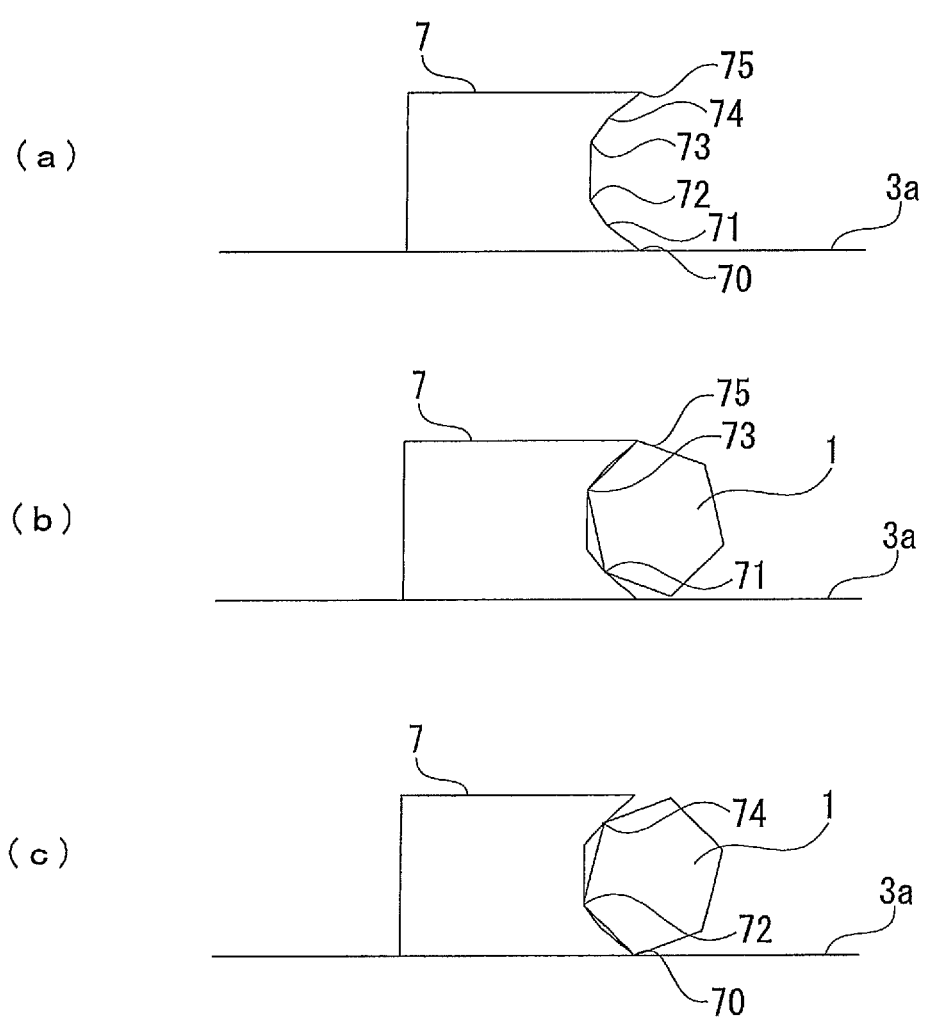
FIG. 7 is a cross sectional view of a segment which is used in a step of manufacturing a bead member according to the other embodiment.
Figure 8:
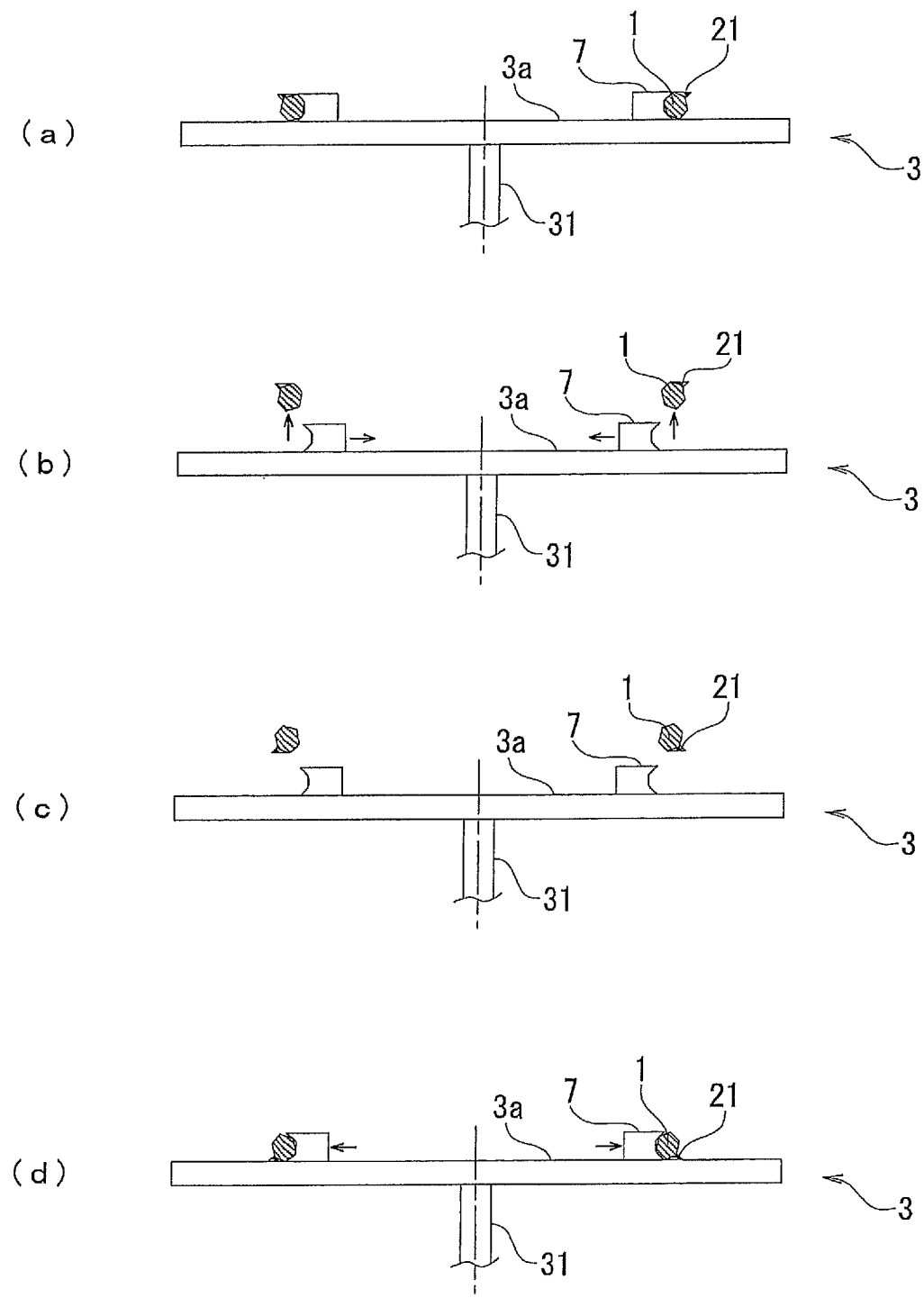
FIG. 8 is an explanatory view for describing a step of manufacturing a bead member according to the other embodiment.
Figure 9:
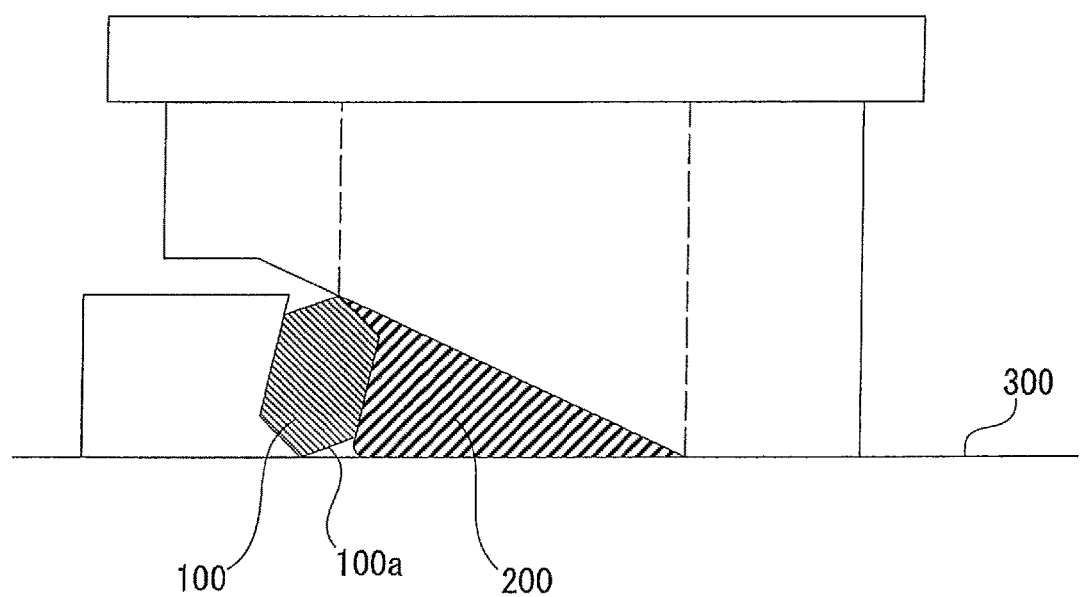
FIG. 9 is a cross sectional view of a bead member which is manufactured according to the prior art.

(6) In order to do away with necessity of turning over the segment or replacing the table during the manufacturing process, the bead core 1 may be fixed by one segment in both of an attitude when the first bead filler portion 21 is formed, and an attitude when the second bead filler portion 22 is formed. FIG. 7A is across sectional view showing an example of a segment. Two outer ends and four depressions are provided on an outer peripheral surface of a segment 7. The outer ends and the depressions are called as a forming surface side outer end 70, a first depression 71, a second depression 72, a third depression 73, a fourth depression 74 and a forming surface reverse side outer end 75 in this order from the closer side to the forming surface 3a. FIG. 7B shows a state of the bead core 1 when the first bead filler portion 21 is formed, and three points existing in an inner peripheral surface of the bead core 1 are fixed by the first depression 71, the third depression 73 and the forming surface reverse side outer end 75. FIG. 7C shows a state of the bead core 1 when the second bead filler portion 22 is formed, and three points existing in the inner peripheral surface of the bead core 1 are fixed by the forming surface side outer end 70, the second depression 72 and the fourth depression 74. As mentioned above, since the bead core 1 in both the attitudes can be fixed by one segment 7, it is not necessary to replace the forming table 3 and the segment 7 during the manufacturing process. FIG. 8 schematically shows a manufacturing process using the segment 7. Although a detailed description will be omitted, it is not necessary to turn over the segment 7 when the bead core 1 is rearranged by turning over as shown in FIG. 8C.

What is claimed is:

1. A bead member manufacturing method for manufacturing a bead member by forming an annular bead filler in an outer peripheral side of an annular bead core, the method comprising:
 a step of arranging the bead core on a forming surface of a forming table;
 a step of forming a first bead filler portion by discharging a first rubber from a mouth piece having a discharge port shape corresponding to a cross sectional shape of the formed first bead filler portion to the bead core, and winding the first rubber in an area circumscribed by the discharge port and a side surface which does not face toward the forming surface in the outer peripheral surface of the arranged bead core;
 a step of rearranging the bead core and the first bead filler portion on the forming surface of the forming table or a forming surface of another forming table by turning over the bead core and the first bead filler portion, the step of rearranging the bead core and the first bead filler portion including a step of detaching the bead core and the first bead filler portion from the forming table so as to turn over, and thereafter arranging the bead core and the first bead filler portion on the forming surface of the other forming table; and a step of forming a second bead filler portion by winding a second rubber in the outer peripheral sides of the bead core and the first bead filler portion so as to form the bead filler.

\* \* \* \* \*